(12) United States Patent
Strecker et al.

(10) Patent No.: US 7,151,481 B1
(45) Date of Patent: Dec. 19, 2006

(54) METHOD FOR DETECTING TARGETS AND DETERMINING THEIR DISTANCE VIA AN HPRF RADAR SYSTEM

(75) Inventors: Andreas Strecker, Uhingen (DE); Andreas Wieszt, Neu-Ulm (DE); Nergess Al-Youssof, Ulm (DE); Thomas Mahr, Illerkirchberg (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 11/269,679

(22) Filed: Nov. 9, 2005

(30) Foreign Application Priority Data

Nov. 10, 2004 (DE) ...................... 10 2004 054 198

(51) Int. Cl.
*G01S 13/12* (2006.01)
(52) U.S. Cl. ...................... 342/137; 342/134; 342/135; 342/196
(58) Field of Classification Search .................. 342/90, 342/118, 134, 135, 137, 140, 202
See application file for complete search history.

(56) References Cited

U.S. PATENT DOCUMENTS

| | | | | |
|---|---|---|---|---|
| 4,642,641 A | * | 2/1987 | Campbell | ................... 342/137 |
| 5,627,545 A | * | 5/1997 | Van Genderen et al. | .... 342/137 |
| 6,225,943 B1 | * | 5/2001 | Curley et al. | ................ 342/137 |
| 6,646,587 B1 | * | 11/2003 | Funai | .......................... 342/137 |
| 6,686,871 B1 | * | 2/2004 | Rohling et al. | ............. 342/130 |

\* cited by examiner

*Primary Examiner*—Ian J. Lobo
(74) *Attorney, Agent, or Firm*—Crowell & Moring LLP

(57) ABSTRACT

A method for detecting targets and determining their distance by means of an HPRF radar system including a transmitter for transmitting bursts having a preselectable number Z of transmission pulses and a preselectable pulse repetition frequency PRF and a receiver for receiving the echo signals. Successive bursts are transmitted with a preselectable time lag, where the time lag corresponds to a preselectable number E of transmission pulses. A data record of Z+E detected signals is generated, where each detected signal consists of superimposed echo signals from different unique distance ranges, each distance range having a number A of distance lines, each line having Z+E distance cells. A target is detected by calculating a Z+E-point fast Fourier transform for each distance line, and determining when the signal amplitude is greater than a preselectable threshold value. The distance to a target is determined by calculating spectra of Z-point fast Fourier transforms for the distance lines by shifting a Z-point FFT window incrementally over the Z+E distance cells of a distance line.

19 Claims, 3 Drawing Sheets

Time range    Sliding FFT

METHOD FOR DETECTING TARGETS AND DETERMINING THEIR DISTANCE VIA AN HPRF RADAR SYSTEM

This application claims the priority of German Application No. 10 2004 054 198.1-55, filed Nov. 10, 2004, the disclosure of which is expressly incorporated by reference herein.

BACKGROUND AND SUMMARY OF THE INVENTION

This invention relates to a method for detecting targets and determining their distance by using an HPRF (High Pulse Repetion Frequency) radar system.

Radar systems are used in flying, floating or ground-supported platforms. Various waveforms are used during operation to take into account the various use scenarios and requirements of the particular radar system. One such waveform is high PRF.

An important use scenario of HPRF radar is, for example, self defense for ships in coastal regions where the discovery of very rapid low-flying rockets, which are difficult to detect, highly maneuverable and appear suddenly and without warning, is essential to survival. Such threats in coastal regions are represented by so-called anti-ship cruise missiles (ASCM) which have a reduced detectability (radar cross section approx. 0.01 $m^2$) and thus greatly shorten the response time to combat the missile.

As a consequence, this new situation demands special sensors that are capable of detecting these targets even in a great deal of clutter, e.g., reflection from cliffs or fiords. In addition, the sensors, i.e., radar, should be able to differentiate these small rockets from land and sea traffic, windmills and birds, whose backscatter cross section is of the same order of magnitude as that of the small rockets, and to do so at the time of detection.

In situations with a large number of targets, radar is necessary because it can detect a great many small targets and on the other hand can differentiate threatening from non-threatening among these many targets. In addition, the response time until recognition of a small target as a threat is also greatly reduced so that there is enough time to take defensive measures.

The object of the present invention is therefore to provide a method which eliminate the disadvantages of the known radar methods.

This invention includes the following method steps in which:

successive bursts are transmitted with a preselectable time lag, where the time lag corresponds to a preselectable number E of transmission pulses, the echo signals are received in the reception time windows between the individual transmission pulses and in the E reception time windows between successive bursts, a data record of Z+E detected signals is generated, where Z denotes the number of transmission pulses within a burst, and each detected signal is a superpositioning of echo signals from different unique distance ranges, where each distance range includes a number A of distance lines, each with Z+E distance cells, for detection of a target, the spectrum of a Z+E-point fast Fourier transform is calculated for each distance line, a decision being made regarding a target in a distance line when the signal amplitude is greater than a preselected threshold value, to determine the exact distance of a target, spectra of Z-point fast Fourier transforms are calculated for the distance lines such that a Z-point FFT window is shifted incrementally over the Z+E distance cells of a distance line, the distance cell having the greatest target signal amplitude is determined by comparing the individual spectra.

BRIEF DESCRIPTION OF THE DRAWINGS

The method according to this invention and other advantageous embodiments are explained in greater detail below with reference to figures in which.

DETAILED DESCRIPTION OF THE INVENTION

If there are two targets at different distances from the radar sensor, reflections from both targets may arrive at the receiver at the same time and are added together. The same thing also happens with clutter from different distance ranges. This effect is known as overfolding. Assuming an instrumented range of 40 kilometers, for example, and a unique range of one kilometer, there is a 40-fold overfolding in the receiver if 40 pulses are transmitted.

Figure 1:
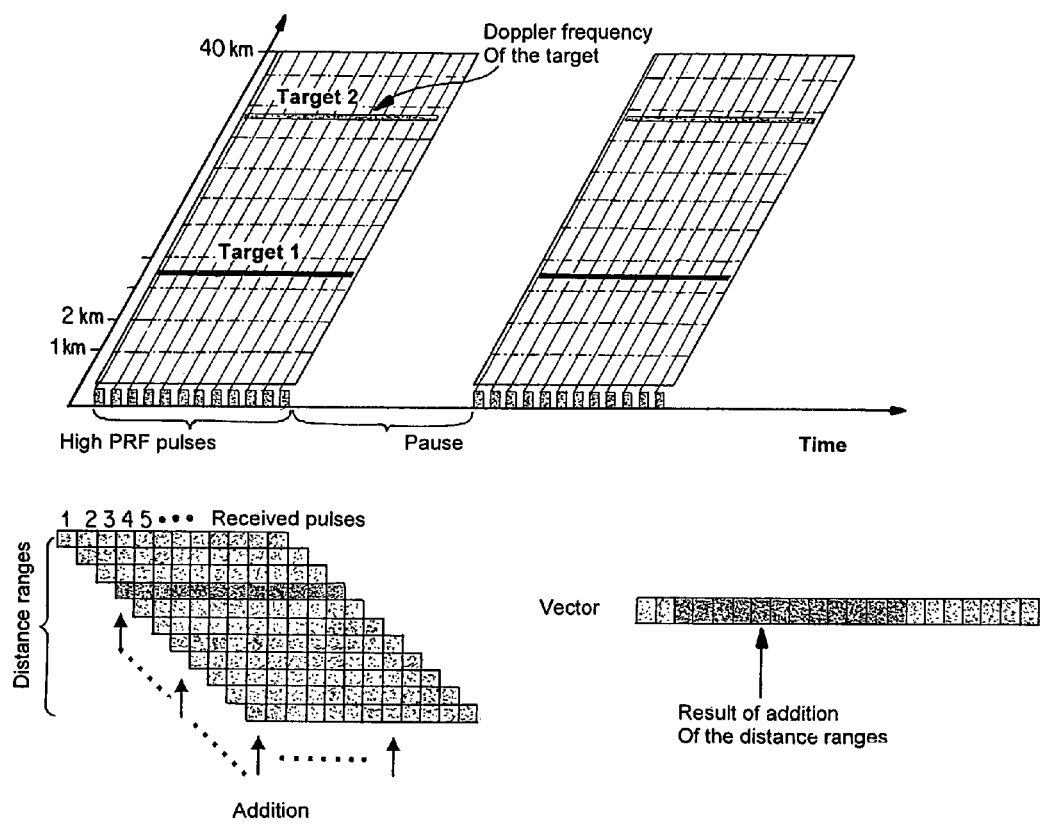
FIG. 1 shows the principle of overfolding through the reduced unique distance range.

FIG. 1 illustrates the principle of overfolding with the so-called "interrupted high PRF waveform." The term "interrupted" comes from the fact that after emission of the burst, there is a pause according to this invention until the last pulse emitted is received from the instrumented range. To simplify the discussion, only 12 pulses are illustrated here with a corresponding pause of 11 pulses with an instrumented range of 40 kilometers as an example.

In addition, a sequence of Z=128 transmission pulses is assumed for a burst as an example. The pause between successive bursts corresponds to the duration of transmission of E=40 pulses, for example (with an instrumented range of 40 kilometers). The receiver detects the reflection for the duration of the transmission plus the added pause because signals are also received during this period of time. All detected signals are then assigned to one burst. If a distance cell length of 40 meters is assumed, for example, then the unique distance range of one kilometer may be subdivided into A=25 distance lines. Conversely, of course, it is also possible to specify the number A of distance lines, so that this results in a certain distance cell length in a unique distance range.

Due to the fixed pulse intervals, the individual distance ranges are folded one above the other in overfolding and the contents of the particular distance cells are added up (at the lower right of FIG. 1 the individual distance ranges are depicted as individual boxes).

The resulting data record of the received signals has the dimension of the 25 distance lines multiplied by the sum of the number of pulses and the required pause. This data record is then processed and analyzed.

Filtering of the clutter in the time range is advantageously performed. The high amplitude of the clutter is advantageously reduced before the first Fourier transform. A window function, e.g., Chebyshev's, may expediently be used for clutter filtering because it improves the filtering of the clutter.

Another possibility for clutter filtering is a simple DC filter which filters out the identical component or a large amplitude value having a frequency approaching zero. The functioning is as follows: when an amplitude value that is greater than a defined threshold occurs, the first excessive amplitude value is subtracted from it and the following amplitude values (up to the burst length). Therefore, the entire signal amplitude is reduced by a constant value. The resulting amplitude jump in the time range no longer affects the subsequent Fourier transform in excessive secondary peaks which can mask the targets.

Clutter filtering can expediently also be implemented by a high-pass filter. This high-pass filter, which, like the DC filter in the time range, is also used before the Fourier transform, filters out the clutter in the lower frequency range.

One advantageous option for clutter filtering is to use a clutter estimator. Very high clutter caused by cliffs or large ships (clutter/target amplitude ratio of >$10^6$) is eliminated by a clutter estimator. The clutter estimator analyzes the received signal for very high jumps in the time range. If great jumps are detected, then the frequency, phase and amplitude of the clutter are estimated. The estimated signal is then subtracted from the received signal in the time range.

Figure 2:
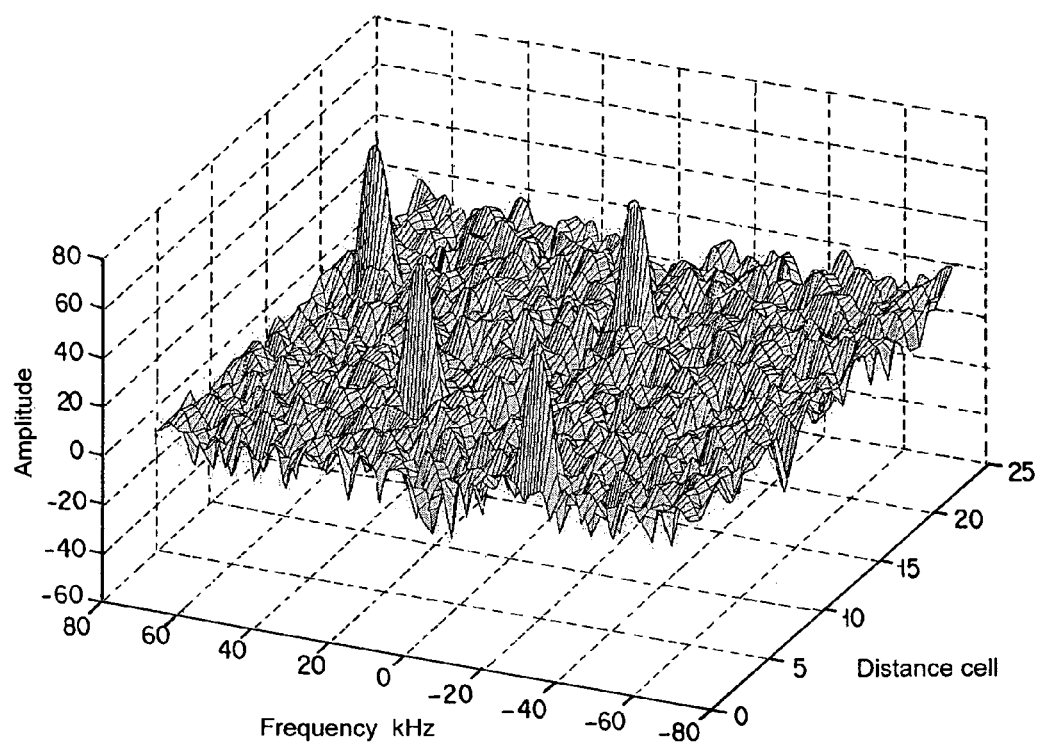
FIG. 2 shows an example of a spectral distribution of different rapid targets with clutter according to Fourier analysis.

After clutter filtering, the data record of the detected signals is processed burst by burst using discrete fast Fourier transform (FFT). FIG. 2 shows as an example the processing of a 168-point FFT (128 transmission pulses per burst plus 40 pulses for the pause between two successive bursts). Only noise and four targets are contained in the example of the processed data record.

The targets have different Doppler frequencies. This is apparent due to the separation in the spectrum. Clutter not contained in the example or the graph is shifted toward very low frequencies and is therefore far from the fast radial targets. For this reason, a fast target flying radially and having a small backscatter cross section, usually representing a very high threat potential, can be detected as such at the time of detection in the HPRF mode of operation.

However, the fast targets usually have very small backscatter cross sections and their signals disappear in the noise of the receiver. However, an advantage is obtained from the fact that a high signal processing gain is ensured due to the high pulse count. This means that the very weak signals of the small targets can be retrieved from far into the noise by the signal processing.

In the spectral analysis, 168-point FFT is performed for each of the 25 distance lines. If there are targets which over a preselectable threshold value condition are detected in this distance line, their Doppler frequency may thus be analyzed directly and therefore the radial speed of the targets can be calculated. At this point in time an assessment of the potential threat can be made immediately.

The distance range and thus the exact distance of the target are determined by the so-called sliding FFT method described below. Advantageously only those distance lines in which targets have been detected are processed. This greatly reduces analysis time so that response time is improved.

Figure 3:
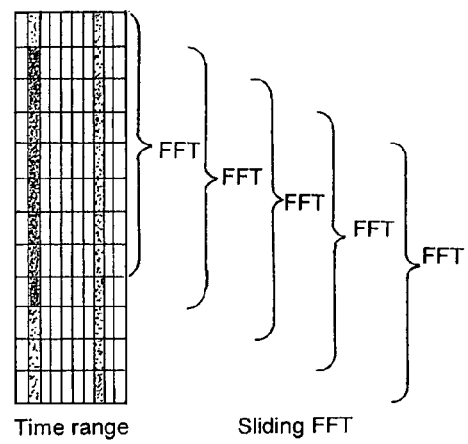
FIG. 3 shows the principle of a sliding FFT on an exemplary data record comprising 10 distance lines each with 12 distance cells.
Figure 4:
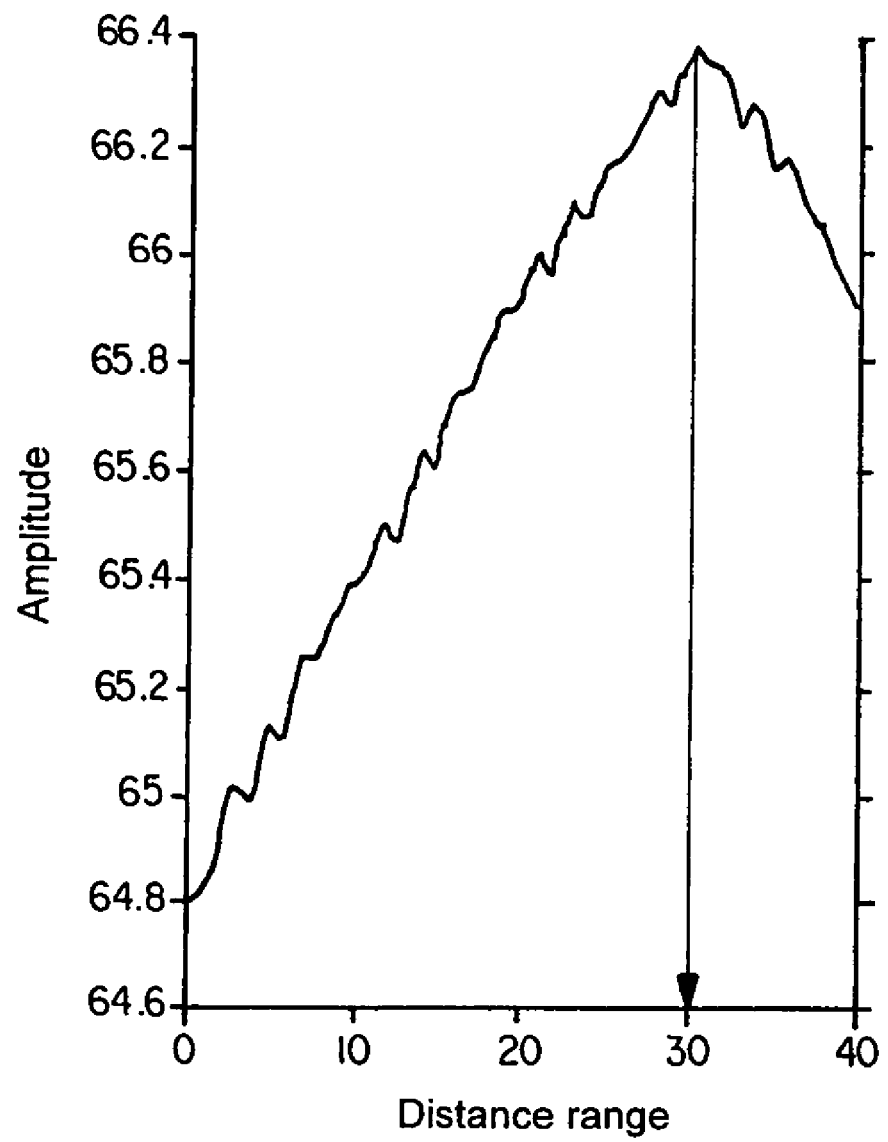
FIG. 4 shows an exemplary single spectrum from a sliding FFT according to Fourier analysis in FIG. 2.

FIG. 3 illustrates the principle of sliding FFT and its results. Based on the example of a burst of 128 transmission pulses and a pause after transmission corresponding to a duration of 40 pulses, a 128-point FFT window is shifted over the received signal (168 pulses long). On the basis of the pause which corresponds to the length of 40 pulses, this shifting of the window must be repeated 40 times. Then the spectra calculated with the 128-point FFT are compared with one another. The amplitude of the respective target in the frequency spectrum is compared with the previous and following amplitudes. The spectrum with the greatest target amplitude is also the spectrum with the greatest energy.

After the spectrum with the greatest target amplitude has been determined, the distance range can be given immediately because the individual spectra are correlated with the distance ranges. The exact position of target(s) can be calculated with a knowledge of the exact distance range (determined with sliding FFT) and the exact distance line (determined from the spectral analysis).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Method for detecting targets and determining their distance by means of an HPRF radar system comprising a transmitter for sending bursts having a preselectable number Z of transmission pulses and a preselectable pulse repetition frequency PRF and a receiver for receiving the echo signals comprising the steps:

transmitting successive bursts with a preselectable time lag, where the time lag corresponds to a preselectable number E of transmission pulses, receiving echo signals in reception time windows between individual ones of said transmission pulses and in the time lag between successive bursts, generating a data record of Z+E detected signals, where each detected signal includes superimposed echo signals from different unique distance ranges, each distance range including a number A of distance lines, each of said distance lines having Z+E distance cells, for detection of a target, calculating the spectrum of a Z+E-point fast Fourier transform for each distance line, wherein a target is detected in a distance line when a signal amplitude is greater than a preselectable threshold value, for determining the exact distance of a target, calculating spectra of Z-point fast Fourier transforms for the distance lines by shifting a Z-point FFT window incrementally over the Z+E distance cells of a distance line, determining the distance cell having the greatest target signal amplitude by comparing individual ones of said spectra.

2. The method as claimed in claim 1, wherein a shift of the Z-point FFT window is performed in the distance lines in which a target has been detected by Z+E-point FFT.

3. The method as claimed in claim 1, further comprising filtering of clutter in a time range of the generated data record.

4. The method as claimed in claim 3, wherein the clutter is filtered by a DC filter.

5. The method as claimed in claim 3, wherein the clutter is filtered by a high-pass filter.

6. The method as claimed in claim 3, wherein the clutter is filtered by a clutter estimator.

7. The method as claimed in claim 1, wherein the pulse repetition frequency is constant for successive bursts.

8. The method as claimed in claim 1, wherein the pulse repetition frequency is variable for successive bursts.

9. The method as claimed in claim 2, further comprising filtering of clutter in a time range of the generated data record.

10. The method as claimed in claim 2, wherein the pulse repetition frequency is constant for successive bursts.

11. The method as claimed in claim 3, wherein the pulse repetition frequency is constant for successive bursts.

12. The method as claimed in claim 4, wherein the pulse repetition frequency is constant for successive bursts.

13. The method as claimed in claim 5, wherein the pulse repetition frequency is constant for successive bursts.

14. The method as claimed in claim 6, wherein the pulse repetition frequency is constant for successive bursts.

15. The method as claimed in claim 2, wherein the pulse repetition frequency is variable for successive bursts.

16. The method as claimed in claim 3, wherein the pulse repetition frequency is variable for successive bursts.

17. The method as claimed in claim 4, wherein the pulse repetition frequency is variable for successive bursts.

18. The method as claimed in claim 5, wherein the pulse repetition frequency is variable for successive bursts.

19. The method as claimed in claim 6, wherein the pulse repetition frequency is variable for successive bursts.

* * * * *